F. KNECHT.
ICE MOTOR CYCLE.
APPLICATION FILED MAR. 20, 1911.
1,010,389.
Patented Nov. 28, 1911.
2 SHEETS—SHEET 1.
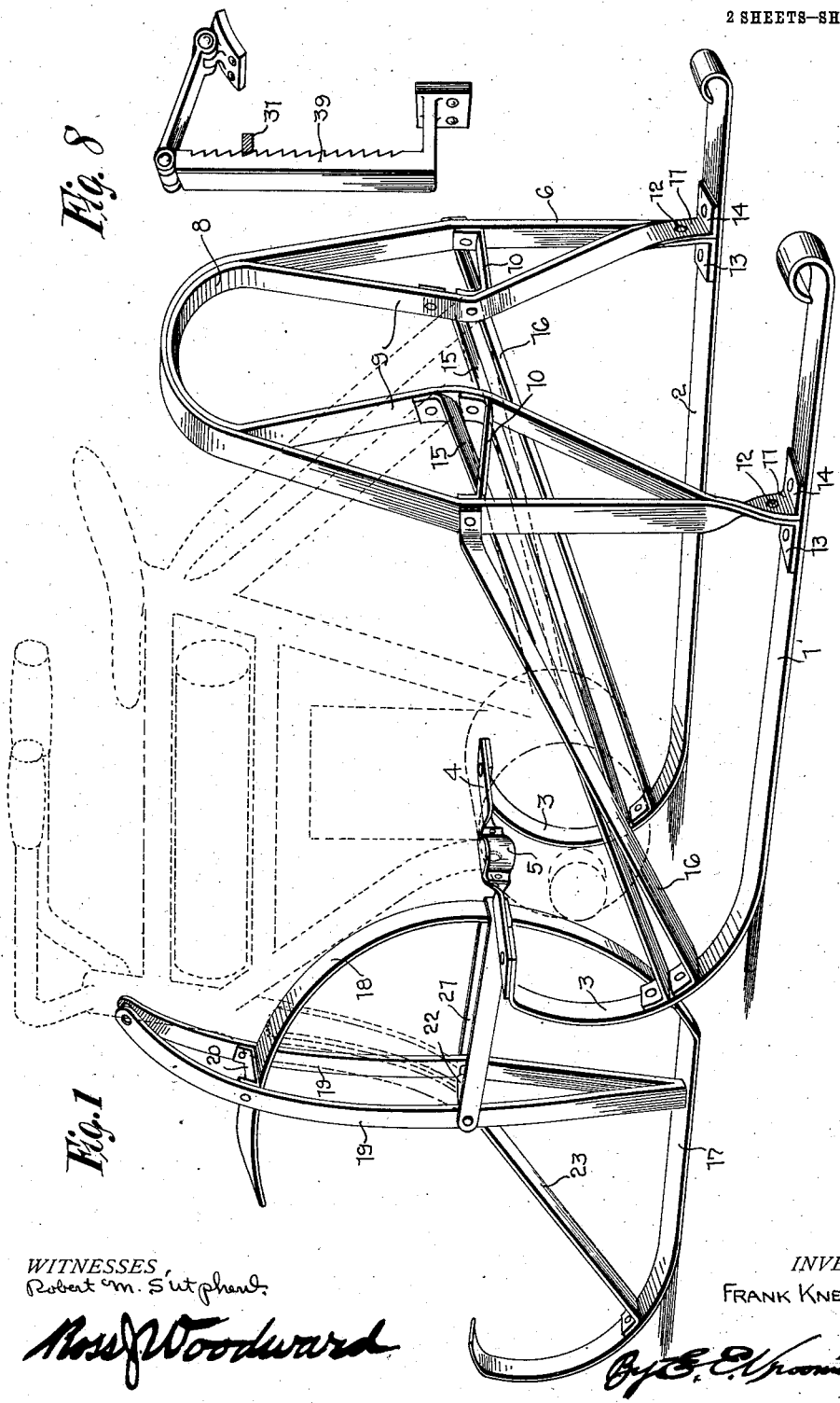
WITNESSES
Robert M. Sutphend.
Ross J. Woodward
INVENTOR
FRANK KNECHT
Attorney

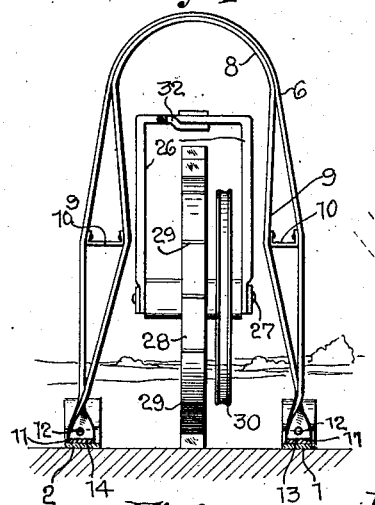
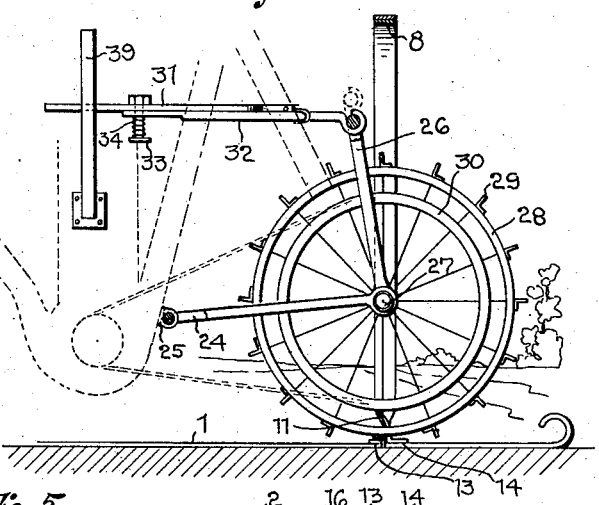
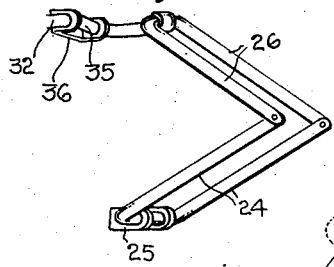
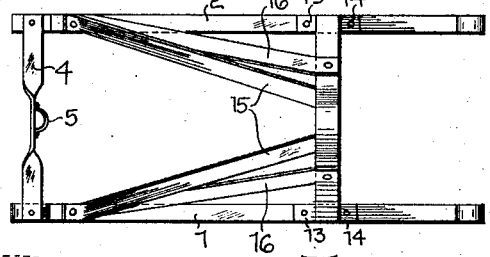
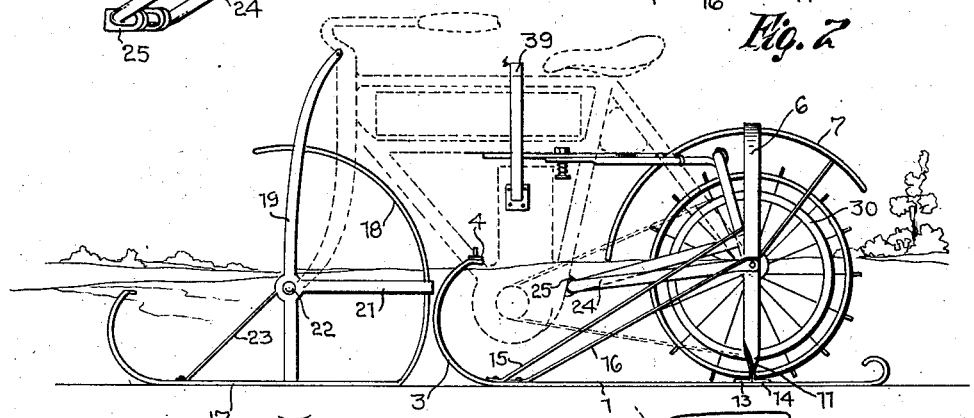
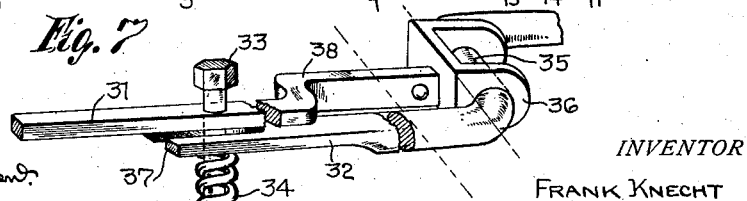

UNITED STATES PATENT OFFICE.

FRANK KNECHT, OF LANCASTER, OHIO.

ICE MOTOR-CYCLE.

1,010,389.   Specification of Letters Patent.   Patented Nov. 28, 1911.

Application filed March 20, 1911.   Serial No. 615,620.

*To all whom it may concern:*

Be it known that I, FRANK KNECHT, a citizen of the United States, residing at Lancaster, in the county of Fairfield and State of Ohio, have invented certain new and useful Improvements in Ice Motor-Cycles, of which the following is a specification, reference being had therein to the accompanying drawing.
This invention relates to an attachment for a bicycle or a motor-cycle which will permit the cycle to be used when there is snow or ice upon the ground.

The principal object of the invention is to construct a set of runners which can be removably secured to the frame work of the machine and also to provide a driving wheel which can be used for driving the machine across the snow.
A second object of the invention is to provide a driving wheel with a novel type of mounting which will permit the wheel to be positioned at any height desired and also to permit the wheel to rise slightly if it strikes an obstruction.

This invention is illustrated in the accompanying drawings, wherein:—

Figure 1 is a perspective view of the runners which form part of this invention.
Fig. 2 is a view in side elevation of the complete attachment. Fig. 3 is a sectional view through the rear runner frame, and shows the manner of mounting the driving wheel. Fig. 4 is a section of the rear runners showing the driving wheel. Fig. 5 is a top plan view of the rear runner frame. Fig. 6 is a perspective view of the means for mounting the driving wheel. Fig. 7 is an enlarged fragmentary view of the adjusting end of the device shown in Fig. 6. Fig. 8 is an enlarged perspective view of the rack which holds the wheel adjusting mechanism in the adjusted position.

This invention comprises a pair of rear runners 1 and 2, which have their forward end portions 3 rolled and connected by a cross bar at the central point of which there is provided a journal 5 by means of which the runners may be removably secured to the frame work of the motor cycle. The runners are connected adjacent their rear ends by means of the bowed strip 6, the upper portion of which is secured to the mud guard 7 of the motor cycle. A strip 8 is positioned within the upper portion of the strip 6 between the strip 6 and the mud guard, and has its intermediate portions 9 bowed and provided with braces 10. The rear forks of the motor-cycle are secured to the strip 8 at the central point of the bowed portions 9. Portions 11 of the strip 8 are secured to the strip 6 by means of the rivets 12 and the end portions of the strips are bent to form the feet 13 and 14, which are secured to the runners 1 and 2. Bracing bars 15 are secured to the bowed portions 9 and to the forward portions of the runners 1 and 2, so that the device will be strengthened. It should be noted however, that these braces are formed of spring metal so that if the front portions of the runners strike any obstructions the braces will take up the jar. Bracing bars 16 are secured to the strip 6 adjacent the braces 10, and are also secured to the runners 1 and 2 adjacent the ends of the braces 15.

The front runner 17 is carried by the mud guard 18 and is provided with a pair of upright bars 19, the upper ends of which are secured to the front post of the motor-cycle. A brace 20 is positioned between the bars 19 and rests upon the mud guard 18. A U-shaped yoke 21 is secured to the mud guard 18 and has its end portions mounted upon the pin 22 upon which the front forks of the motor-cycle are mounted. The bracing bar 23 is secured to the forward portion of the runner 17 and braces the runner so that the forward end will be held above the ground, and also brace it against shocks received by colliding with obstructions in the road.

A toggle is provided having one U-shaped member 24 pivotally connected with the frame of the motor-cycle by means of the bracket 25, and is pivotally connected with its second U-shaped member 26 by means of the axle 27 upon which the wheel 28 is mounted. The wheel 28 is provided with cleats 29 and with a supplemental wheel 30 which is engaged by the driving belt as indicated by the dotted lines in Figs. 2 and 3.

The operating lever comprises a pair of sections 31 and 32 which are yieldably held together by means of the set screw 33 and the spring 34. The section 32 is pivotally connected with the U-shaped member 26 and is crooked intermediate its length to form a journal 35 supported in a bearing bracket 36. This bracket 36 is secured to the upper portions of the rear forks so that the lever will be pivotally mounted upon the forks.

The end portion 37 of the member 32 is bifurcated and positioned to each side of the set screw 33 and with the bifurcated ends resting upon the spring 34. The section 31 has one end portion bent inwardly and pivotally mounted upon the rear fork adjacent the bracket 36. The free end of the member 31 is held in an adjusted position by means of a rack bar 39 which is preferably secured to the engine of the motor cycle and to a frame.

The operation of this device is as follows:—The wheels of the motor cycle are removed and the runners are secured as shown in Fig. 1. The driving wheel is secured to the frame work of the motor cycle as shown in Fig. 3 and the bracket which supports the wheel can be moved to raise or lower the wheel by raising or lowering the lever. When the lever is raised it is rocked upon the bracket 36 and the wheel is lowered so that the cleats 29 will engage the snow or ice and drive the machine forward. If it is desired to coast down a hill with this device the wheel can be raised by lowering the lever and the wheel will then be elevated above the ground. If it is desired to stop the machine when going down a hill or in going along the level the machine can be stopped by means of any suitable device, such as is used on the ordinary motor-cycles to stop the turning of the rear wheel.

What I claim is:—

1. An attachment of the character described comprising a front runner, rear runners, means for removably securing said runners to a cycle frame, a toggle pivotally mounted upon said frame, an axle pivotally connecting the sections of said toggle, a driving wheel mounted upon said axle, a lever comprising a forward and a rear section, said rear section pivotally connected with the upper section of said toggle and bent intermediate its length to form a rocker shaft, a bracket pivotally connecting said rocker shaft with said frame, the free end of said rear member being bifurcated, said forward member being pivotally mounted upon said frame, and spaced above the bifurcated end of said rear member, a set screw passing through said forward member and through the bifurcated end of said rear member, a spring mounted upon said set screw and bearing against said bifurcated end to hold said forward and rear members together, and a rack bar mounted upon said frame and adapted to engage the end of said forward member to hold said lever in an adjusted position.

2. A lever for the purpose described comprising a plurality of sections, one of said sections being bent intermediate its length to form a rocker shaft and having one end bifurcated, a bracket pivotally mounted upon said rocker shaft, the other of said sections being positioned above the bifurcated portion of said first mentioned section, and having one portion bent to one side of said bifurcated portion, and adapted to be pivotally mounted, and resilient means connecting said sections together.

In testimony whereof I hereunto affix my signature in presence of two witnesses.

FRANK KNECHT.

Witnesses:
L. J. KNECHT,
T. M. JOHNSON.

---

Copies of this patent may be obtained for five cents each, by addressing the "Commissioner of Patents, Washington, D. C."